(12) United States Patent
Mitani

(10) Patent No.: US 11,845,207 B2
(45) Date of Patent: Dec. 19, 2023

(54) INJECTION DEVICE INCLUDING SWIVEL MECHANISM AND INJECTION MOLDING MACHINE

(71) Applicant: THE JAPAN STEEL WORKS, LTD., Tokyo (JP)

(72) Inventor: Souma Mitani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/673,018

(22) Filed: Feb. 16, 2022

(65) Prior Publication Data

US 2022/0258390 A1 Aug. 18, 2022

(30) Foreign Application Priority Data

Feb. 17, 2021 (JP) ................................. 2021-023244

(51) Int. Cl.
*B29C 45/07* (2006.01)
*B29C 45/84* (2006.01)
*B29C 45/17* (2006.01)

(52) U.S. Cl.
CPC .......... *B29C 45/07* (2013.01); *B29C 45/1775* (2013.01); *B29C 45/84* (2013.01)

(58) Field of Classification Search
CPC ..... B29C 45/07; B29C 45/1773; B29C 45/17; B29C 45/1775
See application file for complete search history.

(56) References Cited

U.S. PATENT DOCUMENTS

2021/0031417 A1* 2/2021 Yano ...................... B29C 45/07

FOREIGN PATENT DOCUMENTS

| JP | 2002-347072 A | | 12/2002 | |
|----|---------------|---|---------|---|
| JP | 2002347072 | * | 12/2002 | |
| NL | 9002634 | * | 11/1990 | ............. B29C 45/70 |

* cited by examiner

*Primary Examiner* — Alison L Hindenlang
*Assistant Examiner* — Debjani Roy
(74) *Attorney, Agent, or Firm* — Sughrue Mion, PLLC

(57) ABSTRACT

An injection device includes: a swivel base; and an injection unit mounted on the swivel base and configured to be rotatable, in which the injection unit is provided with a swivel mechanism including: a horizontal support shaft having a tip end portion fixed to the injection unit; an axle penetrated by the support shaft at a position eccentric from an axis and rotatably provided with respect to the support shaft; and a wheel penetrated by the axle at a position of an axis and is rotatably provided with respect to the axle, in which in a case where a rotation position is set to a stop position, the wheel is apart from the swivel base, and in which in a case where the rotation position is set to a swivel position, the wheel contacts with the swivel base and the injection unit is swivelable on the swivel base.

14 Claims, 4 Drawing Sheets

INJECTION DEVICE INCLUDING SWIVEL MECHANISM AND INJECTION MOLDING MACHINE

CROSS-REFERENCE TO RELATED APPLICATIONS

This application is based on and claims priority under 35 USC 119 from Japanese Patent Application No. 2021-023244 filed on Feb. 17, 2021, the contents of which are incorporated herein by reference.

TECHNICAL FIELD

The present disclosure relates to an injection device including a swivel base and an injection unit rotatably mounted around a swivel shaft with respect to the swivel base, and an injection molding machine provided with such an injection device.

BACKGROUND

An injection device of an injection molding machine includes an injection unit including a heating cylinder, a screw housed in the heating cylinder, and a screw driving device. When the screw is rotated, an injection material is melted, and when the screw is driven in an axial direction, the injection material is injected. Such an injection unit is provided on a bed as follows. First, a swivel base is provided slidably with respect to the bed. The swivel base is provided with a swivel shaft, and the injection unit is rotatably mounted on the swivel base with respect to the swivel shaft. Swivel of the injection unit is appropriately performed in maintenance, replacement, and the like of the screw, the heating cylinder, and the like.

Since a frictional force between the swivel base and the injection unit is large, a mechanism for swiveling the injection unit is required. For example, a feed screw mechanism is adopted as such a mechanism. The feed screw mechanism includes a relatively long screw shaft and a nut portion screwed to the screw shaft. The screw shaft is rotatably supported about an axis with respect to the swivel base, and the nut portion is fixed to a predetermined member of the injection unit. Therefore, when the screw shaft is rotated, the nut portion slowly slides. Thus, the injection unit can be swiveled. However, there is a problem that in the feed screw mechanism, it is necessary to rotate the screw shaft for a long time, it takes time to swivel the screw shaft, and a large amount of labor is required. On the other hand, JP-A-2002-347072 proposes a swiveling tool including a wheel.

The swiveling tool disclosed in JP-A-2002-347072 is a tool for being attached to a bottom portion of the injection unit when the injection unit is swiveled. Specifically, the following operation is performed. First, the swiveling tool is disposed at the bottom portion of the injection unit. At this time, the wheel provided in the swiveling tool contacts with the swivel base. A bolt provided in the swiveling tool is rotated. Then, the injection unit is jacked up by the bolt, and the injection unit floats from the swivel base. In this state, a height adjusting member is inserted into a gap between an upper surface of the swiveling tool and the bottom portion of the injection unit, and the bolt is loosened. Then, the injection unit is in a state of being mounted on the swiveling tool. With travelling of the wheel of the swiveling tool, the injection unit is swiveled.

SUMMARY

The swiveling tool disclosed in JP-A-2002-347072 needs to be attached to the injection unit when the injection unit is swiveled. In addition, attachment work for attachment of the swiveling tool is complicated.

The present disclosure provides an injection device and an injection molding machine that require less work to swivel an injection unit on a swivel base.

Other problems and novel features will become apparent from description of the specification and the accompanying drawings.

An injection device includes a swivel base and an injection unit rotatably provided on a swivel base. In the present disclosure, a swivel mechanism is provided in the injection unit. The swivel mechanism includes a horizontal support shaft having a tip end portion fixed to the injection unit; an axle penetrated by the support shaft and rotatable with respect to the support shaft; and a wheel provided on the axle. However, in the axle, a position penetrated by the support shaft is eccentric from an axis. When the axle is rotated with respect to the support shaft and a rotation position is set to a stop position, the wheel is apart from the swivel base. On the other hand, when the rotation position of the axle is set to a swivel position, the wheel contacts with the swivel base and the injection unit is swivelable on the swivel base.

In the present disclosure, the injection unit can be swiveled simply by rotating the axle with respect to the support shaft to change the rotation position, and work required for swivel is small.

DETAILED DESCRIPTION

Figure 1:
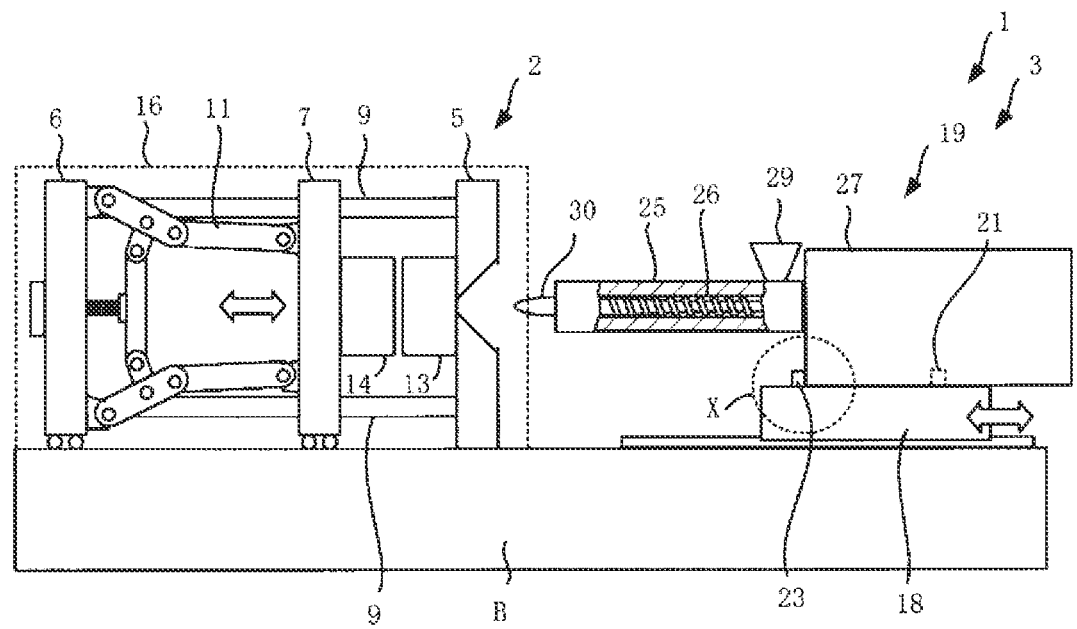
FIG. 1 is a front view showing an injection molding machine according to the present embodiment.

Hereinafter, a specific embodiment will be described in detail with reference to the drawings. However, the present disclosure is not limited to the following embodiment. The following description and drawings are simplified as appropriate to clarify the description. In the drawings, the same elements are designated by the same reference signs, and duplicate explanations are omitted as necessary. In addition, hatching is omitted in some parts so that the drawings are not complicated.

The present embodiment will be described.

<Injection Molding Machine>

An injection molding machine 1 according to the present embodiment is configured as shown in FIG. 1. That is, the injection molding machine 1 schematically includes a mold clamping device 2 that clamps a mold and an injection device 3 that melts an injection material and injects the melted injection material.

<Mold Clamping Device>

In the present embodiment, the mold clamping device 2 includes a fixed platen 5 fixed on a bed B, a mold clamping housing 6 that slides on the bed B, and a movable platen 7 that similarly slides on the bed B. The fixed platen 5 and the mold clamping housing 6 are connected to each other by a plurality of, for example, four tie bars 9. The movable platen 7 is slidable between the fixed platen 5 and the mold clamping housing 6. A mold clamping mechanism 11 is provided between the mold clamping housing 6 and the movable platen 7. The mold clamping mechanism 11 may include a direct pressure type mold clamping mechanism, that is, a mold clamping cylinder, but in the present embodiment, the mold clamping mechanism 11 includes a toggle mechanism. Molds 13 and 14 are provided on the fixed platen 5 and the movable platen 7, respectively, and the molds 13 and 14 are opened and closed when the mold clamping mechanism 11 is driven. The mold clamping device 2 is covered with a cover 16.

<Injection Device>

The injection device 3 includes a swivel base 18 and an injection unit 19 provided on the swivel base 18. The swivel base 18 is provided slidably with respect to the bed B, and is brought close to or apart from the mold clamping device 2. The swivel base 18 is provided with a swivel shaft 21, and the injection unit 19 is rotatably mounted on the swivel base 18 with respect to the swivel shaft 21. As will be described in detail later, the injection unit 19 is provided with a swivel mechanism 23 according to the present embodiment, so that the injection unit 19 can be easily swiveled.

<Injection Unit>

The injection unit 19 includes a heating cylinder 25, a screw 26 housed in the heating cylinder 25, and a screw driving device 27 to which the heating cylinder 25 is attached and which drives the screw 26. A hopper 29 is provided near a rear end portion of the heating cylinder 25, and an injection nozzle 30 is provided at a tip end of the heating cylinder 25. Such an injection unit 19 is integrally swiveled during replacement work and maintenance work of the heating cylinder 25 and the screw 26.

<Swivel Mechanism>

Figure 2:
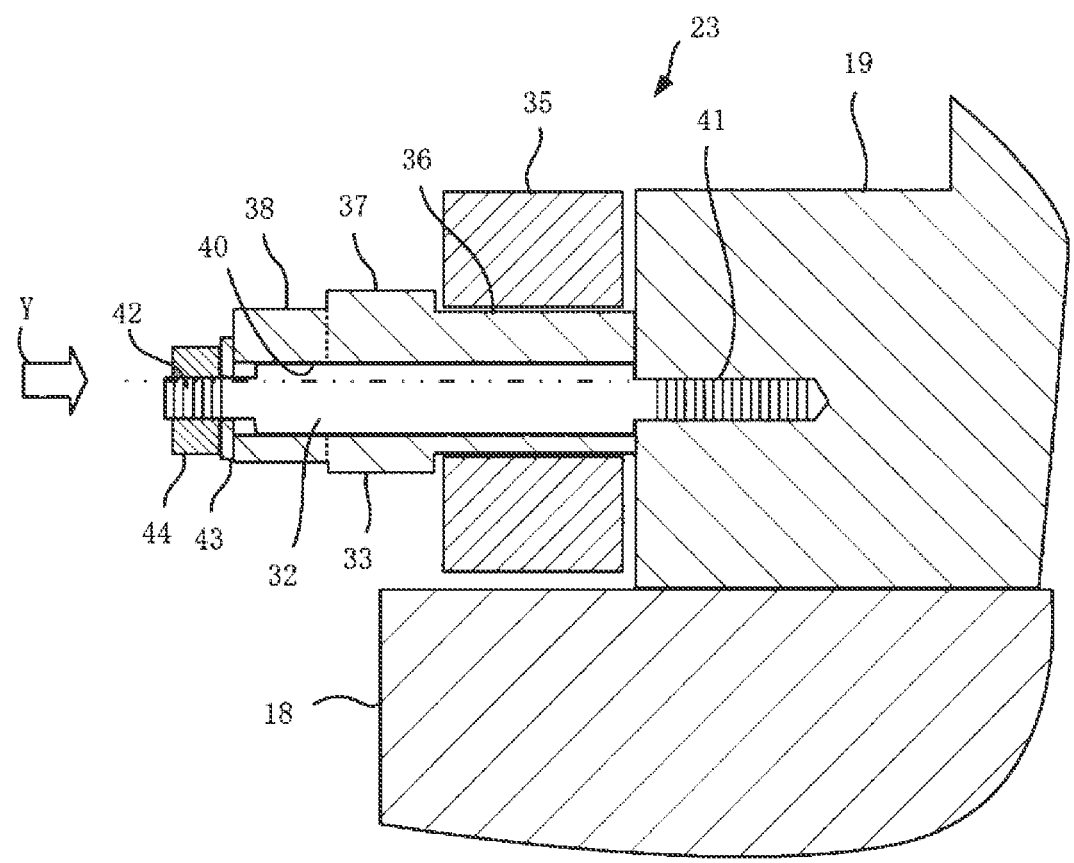
FIG. 2 is a front sectional view showing a swivel mechanism, a part of a swivel base, and a part of an injection unit according to the present embodiment.
Figure 3:
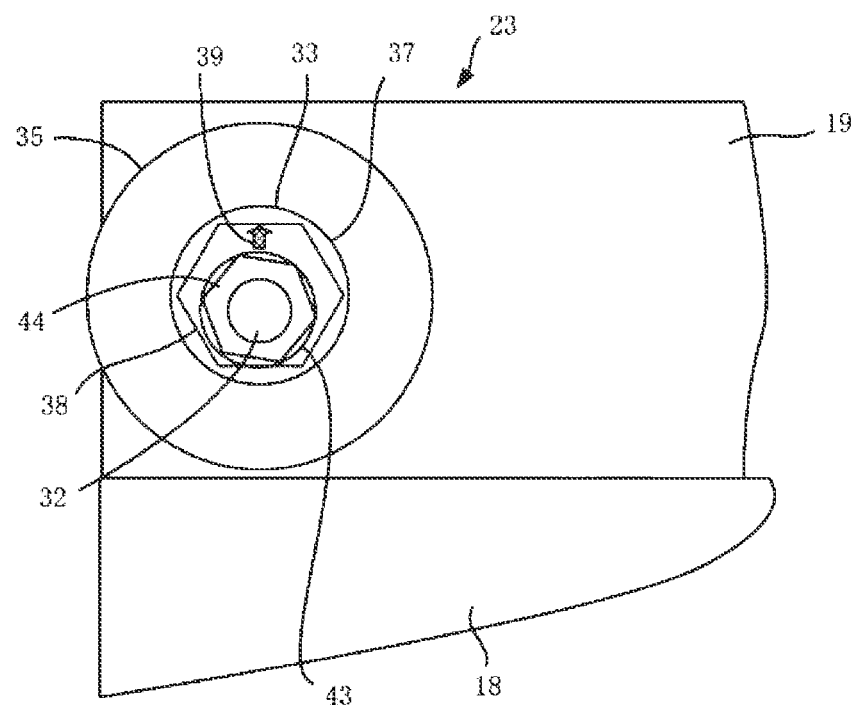
FIG. 3 is a side view showing the swivel mechanism, a part of the swivel base, and a part of the injection unit according to the present embodiment.

FIGS. 2 and 3 show the swivel mechanism 23 according to the present embodiment. FIG. 2 is a front sectional view of the swivel mechanism 23 in which a portion of a reference sign X in FIG. 1 is enlarged and shown. FIG. 3 is a side view of the swivel mechanism 23 as seen from a direction of an arrow Y in FIG. 2. The swivel mechanism 23 schematically includes an axle 33, a wheel 35 provided on the axle 33, and a support shaft 32 that penetrates the axle 33 and fixes the swivel mechanism 23 on the injection unit 19.

The axle 33 is a characteristic member of the swivel mechanism 23 according to the present embodiment, and has several features. First, the axle 33 includes a shaft portion 36 having a relatively small diameter and an enlarged diameter portion 37 having a diameter larger than that of the shaft portion 36. The wheel 35 is provided on the shaft portion 36 so as to smoothly rotate, and a side of the wheel 35 is guided by the enlarged diameter portion 37. A hexagon nut is integrally fixed on the axle 33. That is, a nut portion 38 is provided. As will be described later, the nut portion 38 can be engaged with a wrench or the like to rotate the axle 33. As shown in FIG. 3, a marker 39 of an arrow mark is attached to the nut portion 38. The marker 39 is a visual recognition portion where a rotation position of the axle 33 is easily visually checked.

The axle 33 is penetrated by the support shaft 32 and is rotatable around the support shaft 32, but is characterized by a position of being penetrated. That is, a through hole 40 of the axle 33 is formed at a position deviated from an axis of the axle 33, that is, at an eccentric position. Therefore, when the axle 33 is rotated with respect to the support shaft 32, a height of the wheel 35 changes up and down.

A male screw 41 is formed at one end portion of the support shaft 32, and the male screw 41 is screwed into a female screw opened in the injection unit 19 and fixed on the injection unit 19 horizontally. When the support shaft 32 is thus fixed to the injection unit 19, the swivel mechanism 23 is attached to the injection unit 19.

A male screw 42 is formed at the other end portion of the support shaft 32, a washer 43 is inserted into the male screw 42, and a nut 44 is screwed into the male screw 42. The male screw 42, the washer 43, and the nut 44 serve as a fixing portion configured to restrict rotation of the axle 33. That is, when the nut 44 is tightened, the washer 43 is strongly pressed against the axle 33, and the rotation of the axle 33 with respect to the support shaft 32 is restricted by a frictional force. That is, the rotation position of the axle 33 is fixed. On the other hand, when the nut 44 is loosened, friction between the washer 43 and the axle 33 is reduced, and the axle 33 can be rotated with respect to the support shaft 32.

<Operation of Swivel Mechanism According to Present Embodiment>

In a state in which the injection molding machine 1 can be operated, as shown in FIG. 1, the injection unit 19 is aligned in a direction of the fixed platen 5. At this time, in the swivel mechanism 23 according to the present embodiment, the rotation position of the axle 33 is a stop position (see FIGS. 2 and 3). When the rotation position of the axle 33 is the stop position, as shown in FIG. 3, the arrow mark of the marker 39 points to an upper side. At this stop position, the wheel 35 is in a state of floating apart from the swivel base 18, and an entire bottom surface of the injection unit 19 is in close contact with the swivel base 18. Although not shown in the drawings, the injection unit 19 is fastened to the swivel base 18 by a fastening unit such as a bolt, and swivel is restricted.

Figure 4:
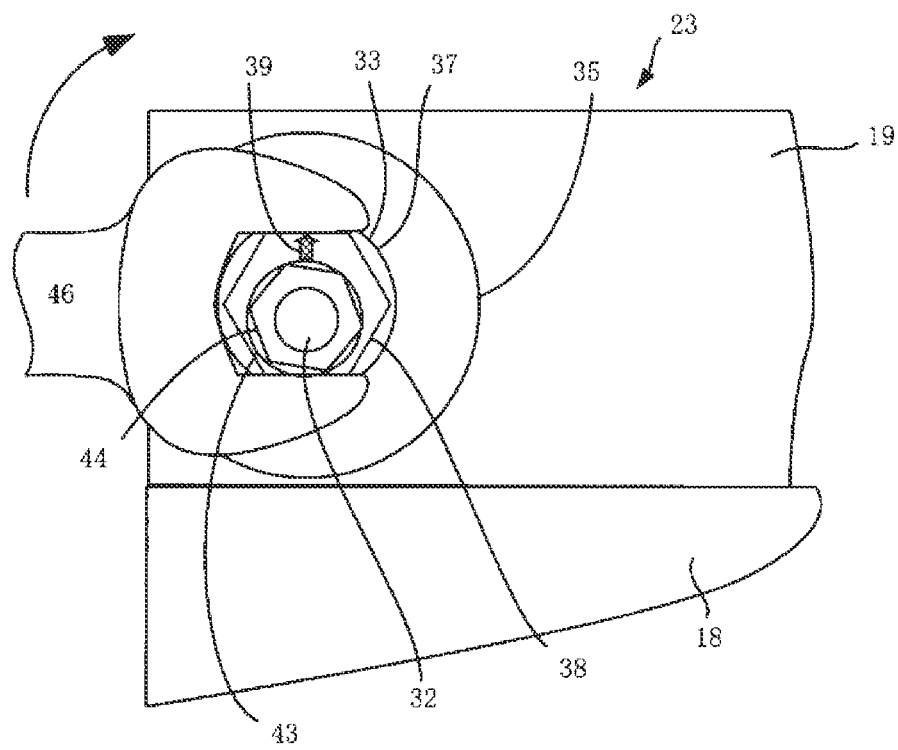
FIG. 4 is a side view showing the swivel mechanism, a part of the swivel base, and a part of the injection unit according to the present embodiment.
Figure 5:
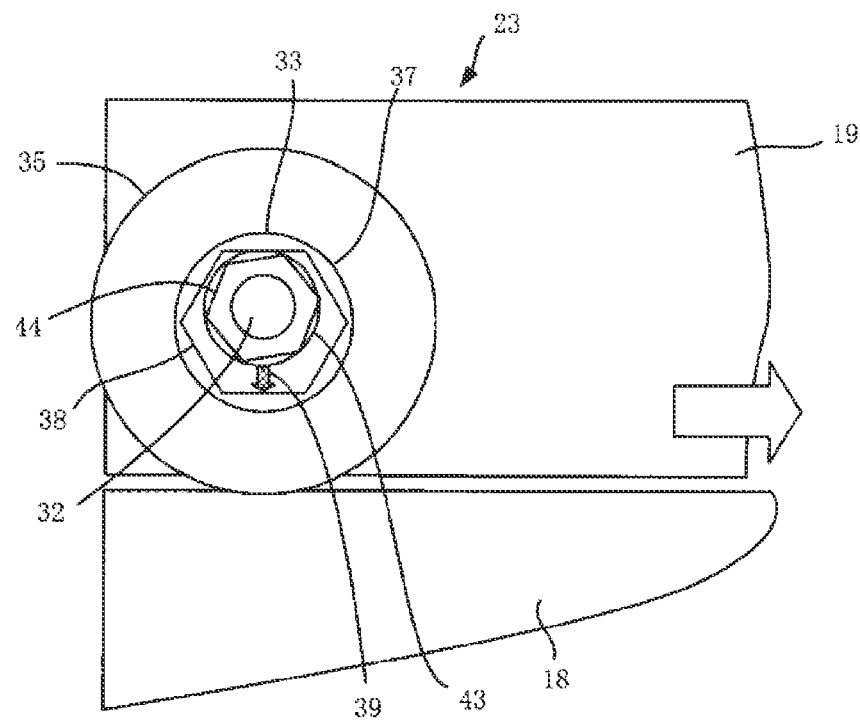
FIG. 5 is a side view showing the swivel mechanism, a part of the swivel base, and a part of the injection unit according to the present embodiment.
Figure 6:
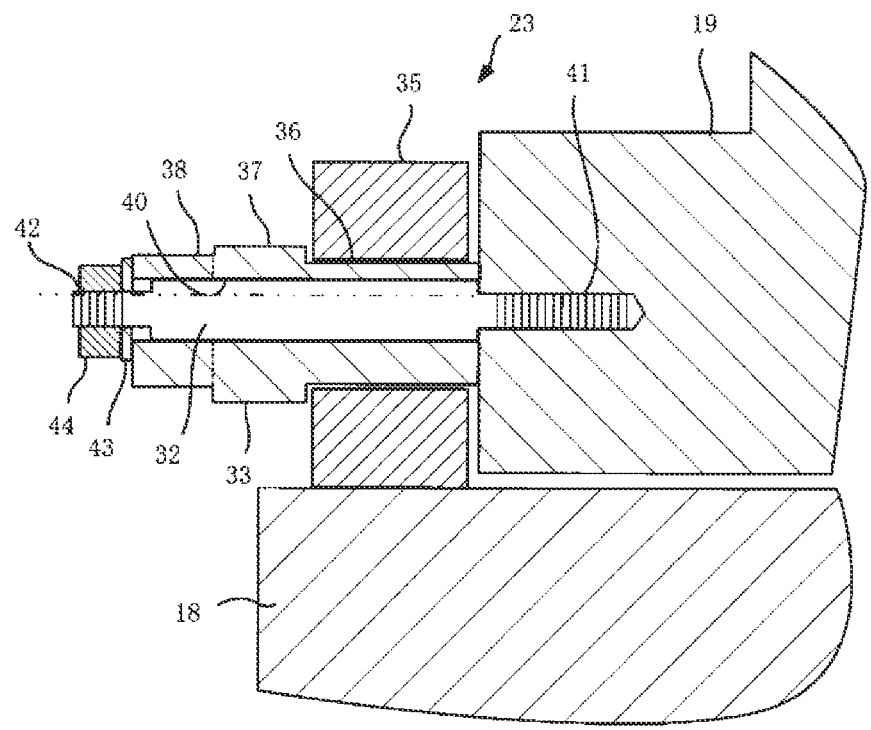
FIG. 6 is a front sectional view showing the swivel mechanism, a part of the swivel base, and a part of the injection unit according to the present embodiment.

When maintenance of the injection unit 19 is performed, such as replacement of the heating cylinder 25 and replacement of the screw 26, it is necessary to swivel the injection unit 19. The fastening unit (not shown in the drawings) is operated to release fastening of the injection unit 19 to the swivel base 18. The nut 44 is loosened to bring the axle 33 into a rotatable state with respect to the support shaft 32, and as shown in FIG. 4, a wrench 46 is engaged with the nut portion 38 of the axle 33. Then, the wrench 46 is operated to rotate the axle 33. As a result, the height of the wheel 35 decreases, and the wheel 35 contacts with the swivel base 18. When the axle 33 is further rotated, as shown in FIGS. 5 and 6, the injection unit 19 is lifted up by the wheel 35, and the injection unit 19 slightly floats from the swivel base 18. The arrow mark of the marker 39 (see FIG. 5) faces downward. That is, the rotation position of the axle 33 becomes a swivel position. The nut 44 is tightened to restrict the rotation of the axle 33.

Figure 7:
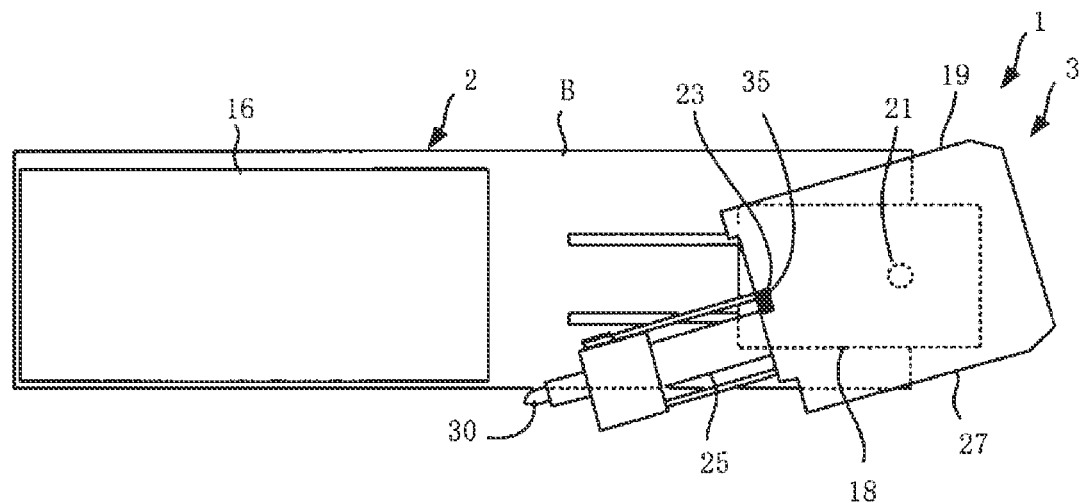
FIG. 7 is a top view showing the injection molding machine according to the present embodiment.

Since the injection unit 19 slightly floats from the swivel base 18 by the wheel 35, as shown in FIG. 7, the injection unit 19 can be easily swiveled by human power. Necessary maintenance is performed on the injection unit 19. When it is desired to prevent the injection unit 19 from swiveling during the maintenance, the nut 44 is loosened to set the rotation position of the axle 33 to the stop position. As a result, the entire bottom surface of the injection unit 19 comes into close contact with the swivel base 18, and it is difficult for the injection unit 19 to swirl. When the maintenance is completed, the rotation position of the axle 33 is set to the swivel position, and the injection unit 19 is swiveled. That is, the injection unit 19 is returned to an original position. The rotation position of the axle 33 is set to the stop position, and the nut 44 is tightened to restrict the rotation of the axle 33. The fastening unit (not shown in the drawings) is operated to fasten the injection unit 19 to the swivel base 18.

Figure 8:
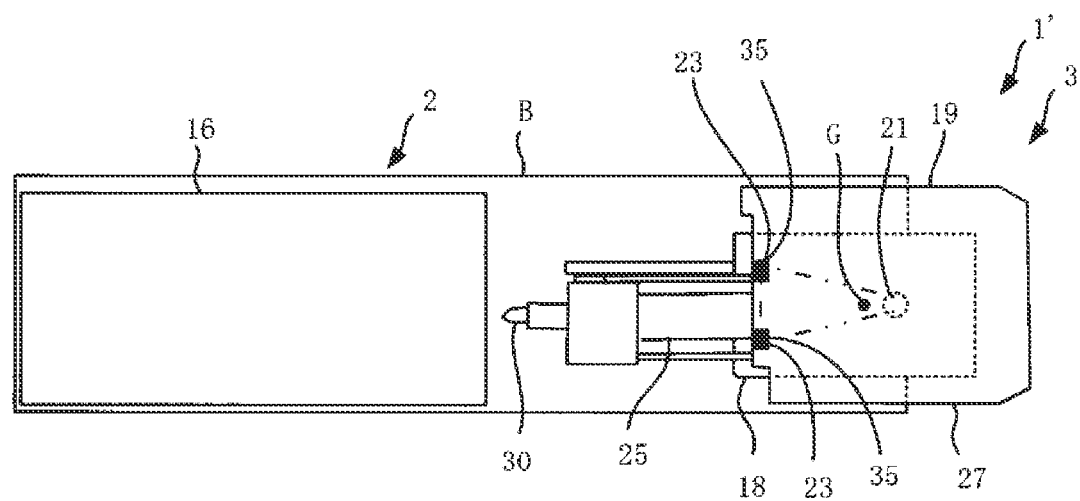
FIG. 8 is a top view showing an injection molding machine according to the present embodiment.

The injection molding machine 1 according to the present embodiment can be modified in various ways. For example, a plurality of swivel mechanisms 23 may be provided. FIG. 8 shows an injection molding machine 1' in which the injection unit 19 is provided with two swivel mechanisms 23, 23. In this embodiment, since the two swivel mechanisms 23, 23 are provided, the injection unit 19 can be further smoothly swiveled. In the injection molding machine 1' according to this embodiment, attention is paid to arrangement of the two swivel mechanisms 23, 23, that is, arrangement of two wheels 35, 35. Specifically, when viewed from a vertical direction, positions of the wheels 35, 35 are selected such that a center of gravity G of the injection unit 19 is located inside a triangle having the two wheels 35, 35 and the swivel shaft 21 as vertices. Therefore, the injection unit 19 can stably swivel. Even when three or more swivel mechanisms 23, 23 are provided, the center of gravity G of the injection unit 19 may be located inside a polygon having a plurality of wheels 35, 35, and so on and the swivel shaft 21 as the vertices.

As shown in FIG. 3, as the visual recognition portion where the rotation position of the axle 33 is checked, the marker 39 is described as being provided on the nut portion 38 of the axle 33, but this configuration can also be modified. For example, a notch may be formed in an outer peripheral surface of the enlarged diameter portion 37 of the axle 33, and the rotation position may be checked at a position of the notch. Other configurations can also be modified. For example, the fixing portion is described as including the male screw 42, the washer 43, and the nut 44 of the support shaft 32, but this configuration can also be modified. For example, a common key hole that is orthogonal to axes of the support shaft 32 and the axle 33 is formed with respect to the support shaft 32 and the axle 33. When a key is inserted into the key hole, the axle 33 is locked with respect to the support shaft 32. That is, the axle 33 is fixed to the support shaft 32. When the key is removed, the axle 33 is allowed to rotate.

Although the invention made by the present inventor has been specifically described above based on the embodiment, it is needless to say that the present invention is not limited to the embodiment described above, and various modifications can be made without departing from the gist of the present invention. The plurality of examples described above can be implemented in combination as appropriate.

What is claimed is:
1. An injection device comprising:
a swivel base; and
an injection unit mounted on the swivel base and configured to rotate about a swivel shaft with respect to the swivel base,
wherein the injection unit is provided with a swivel mechanism including:
a horizontal support shaft having a tip end portion fixed to the injection unit;
an axle penetrated by the support shaft at a position eccentric from an axis and rotatably provided with respect to the support shaft; and
a wheel penetrated by the axle at a position of an axis and is rotatably provided with respect to the axle,
wherein in a case where the axle is rotated with respect to the support shaft and a rotation position is set to a stop position, the wheel is apart from the swivel base, and
wherein in a case where the rotation position is set to a swivel position, the wheel contacts with the swivel base and the injection unit is swivelable on the swivel base.
2. The injection device according to claim 1, wherein the swivel mechanism includes a fixing portion configured to fix the rotation position of the axle.
3. The injection device according to claim 1, wherein the swivel mechanism includes a visual recognition portion where the rotation position of the axle is visually checked.
4. The injection device according to claim 1, wherein the injection unit is provided with a plurality of swivel mechanisms.
5. An injection molding machine comprising:
an injection device configured to inject a resin; and
a mold clamping device configured to clamp a mold,
wherein the injection device includes a swivel base and an injection unit mounted on the swivel base,
wherein the injection unit is provided with a swivel mechanism including:
a horizontal support shaft having a tip end portion fixed to the injection unit;
an axle penetrated by the support shaft at a position eccentric from an axis and rotatably provided with respect to the support shaft; and
a wheel penetrated by the axle at a position of an axis and is rotatably provided with respect to the axle,
wherein in a case where the axle is rotated with respect to the support shaft and a rotation position is set to a stop position, the wheel is apart from the swivel base, and
wherein in a case where the rotation position is set to a swivel position, the wheel contacts with the swivel base and the injection unit is swivelable on the swivel base.
6. The injection device according to claim 1, wherein the swivel mechanism is disposed on an upper portion of the swivel base.
7. The injection device according to claim 1, wherein in the case where the axle is rotated with respect to the support shaft, a height of the wheel changes in a direction perpendicular to the support shaft.
8. The injection device according to claim 4,
wherein a center of gravity of the injection unit is located inside a polygon having the wheel and the swivel shaft of each of the plurality of swivel mechanisms as vertices when viewed from a vertical direction.
9. The injection molding machine according to claim 5, wherein the swivel mechanism includes a fixing portion configured to fix the rotation position of the axle.
10. The injection molding machine according to claim 5, wherein the swivel mechanism includes a visual recognition portion where the rotation position of the axle is visually checked.
11. The injection molding machine according to claim 5, wherein the injection unit is provided with a plurality of swivel mechanisms.

12. The injection molding machine according to claim 5, wherein the swivel mechanism is disposed on an upper portion of the swivel base.

13. The injection molding machine according to claim 5, wherein in the case where the axle is rotated with respect to the support shaft, a height of the wheel changes in a direction perpendicular to the support shaft.

14. The injection molding machine according to claim 11, wherein a center of gravity of the injection unit is located inside a polygon having the wheel and the swivel shaft of each of the plurality of swivel mechanisms as vertices when viewed from a vertical direction.

* * * * *